(12) United States Patent
Poor et al.

(10) Patent No.: US 8,939,457 B2
(45) Date of Patent: Jan. 27, 2015

(54) ARM AND LEG POWERED VEHICLE

(71) Applicant: Ralph P. Poor, Toledo, OH (US)

(72) Inventors: Adam C. Poor, Toledo, OH (US); Ralph P. Poor, Toledo, OH (US)

(*) Notice: Subject to any disclaimer, the term of this patent is extended or adjusted under 35 U.S.C. 154(b) by 0 days.

(21) Appl. No.: 13/729,684

(22) Filed: Dec. 28, 2012

(65) Prior Publication Data

US 2014/0015218 A1 Jan. 16, 2014

Related U.S. Application Data

(60) Provisional application No. 61/581,316, filed on Dec. 29, 2011.

(51) Int. Cl.
- *B62M 1/12* (2006.01)
- *B62M 23/00* (2006.01)
- *B62M 1/16* (2006.01)

(52) U.S. Cl.
CPC ................. *B62M 1/12* (2013.01); *B62M 23/00* (2013.01); *B62M 1/16* (2013.01)

USPC .......................................................... 280/233

(58) Field of Classification Search
USPC ....................... 280/232, 233, 234, 242.1, 244
See application file for complete search history.

(56) References Cited

U.S. PATENT DOCUMENTS

| | | |
|---|---|---|
| 5,816,600 A | 10/1998 | Matsuura |
| 6,086,079 A | 7/2000 | Farina |
| 6,099,009 A | 8/2000 | Schroeder |
| 6,764,089 B2 | 7/2004 | Drymalski |
| 7,497,793 B2 | 3/2009 | Hee |
| 7,823,898 B2 | 11/2010 | Hartmann |
| 7,896,375 B2 | 3/2011 | Cynn |

*Primary Examiner* — Tony Winner (74) *Attorney, Agent, or Firm* — MacMillan, Sobanski & Todd, LLC (57) ABSTRACT

A vehicle is provided that includes a frame having a drive member supported for rotation thereon. A handlebar is supported for pivotal movement relative to the frame. A drive mechanism is provided on the frame that is configured to rotate the drive member in a first rotational direction when the handlebar is pivoted in either a first direction using a push-stroke or a second direction using a pull-stroke.

18 Claims, 7 Drawing Sheets

ARM AND LEG POWERED VEHICLE

CROSS-REFERENCE TO RELATED APPLICATIONS

This application claims the benefit of U.S. Provisional Application No. 61/581,316, filed Dec. 29, 2011, the disclosure of which is incorporated herein by reference.

BACKGROUND OF THE INVENTION

This invention relates in general to vehicles that are supported on a plurality of wheels, such as human-powered bicycles and the like. In particular, this invention relates to a vehicle having a drive mechanism that is configured to propel the vehicle forward by pivoting a handlebar in either a first direction using a push-stroke or a second direction using a pull-stroke.

Bicycles are human-powered vehicles that can be used for transportation, recreation, and many other purposes. A typical bicycle includes a frame that is supported on a plurality of wheels, such as a front wheel and a rear wheel. The front wheel is rotatably supported on a fork, and the fork is supported on the frame of the bicycle for pivoting movement in left and right directions. A handlebar is connected to the front fork to allow a rider to steer the bicycle in the left and right directions. A typical bicycle also includes a leg-powered crank mechanism. The leg-powered crank mechanism usually includes a pair of pedals that are connected to respective crank arms provided on opposite sides of a drive sprocket. The drive sprocket is, in turn, supported on the frame for relative rotational movement. A chain and sprocket drive system can be provided to transmit rotational power from the drive sprocket to the rear wheel. As a result, a rider of the bicycle can propel the bicycle in a forward direction by rotating the drive sprocket with his or her feet.

It is also known to provide a bicycle with an arm-powered drive mechanism as a means for propelling the bicycle in the forward direction, either in lieu of or as a supplement to the leg-powered crank mechanism. In one example, the arm-powered drive mechanism is somewhat similar to the leg-powered crank mechanism, including a pair of handles that are connected to respective crank arms provided on opposite sides of a drive sprocket. The drive sprocket is, in turn, supported on the handlebar or similar support structure for relative rotational movement, and a chain and sprocket drive system is provided to transmit rotational power from the rotating handles to the front wheel. This configuration allows the rider to propel the bicycle in the forward direction rotating the drive sprocket with his or her hands.

However, this and other known types of arm-powered drive mechanisms may be somewhat difficult to operate while attempting to balance and steer the bicycle during use. Such arm-powered drive mechanisms can also be relatively inefficient for propelling the bicycle at high speeds or up an incline. Therefore, it would be desirable to provide a bicycle having an improved arm-powered drive mechanism that is easy to operate and efficient.

SUMMARY OF THE INVENTION

This invention relates to a bicycle having an improved arm-powered drive mechanism that is easy to operate and efficient. In a broad aspect, there is provided a vehicle including a frame having a drive member supported for rotation thereon. A handlebar is supported for pivotal movement relative to the frame. A drive mechanism is provided on the frame that is configured to rotate the drive member in a first rotational direction when the handlebar is pivoted in either a first direction using a push-stroke or a second direction using a pull-stroke.

Various objects and aspects of this invention will become apparent to those skilled in the art from the following detailed description of the preferred embodiment, when read in light of the accompanying drawings.

DETAILED DESCRIPTION OF THE ILLUSTRATED EMBODIMENT

Figure 1:
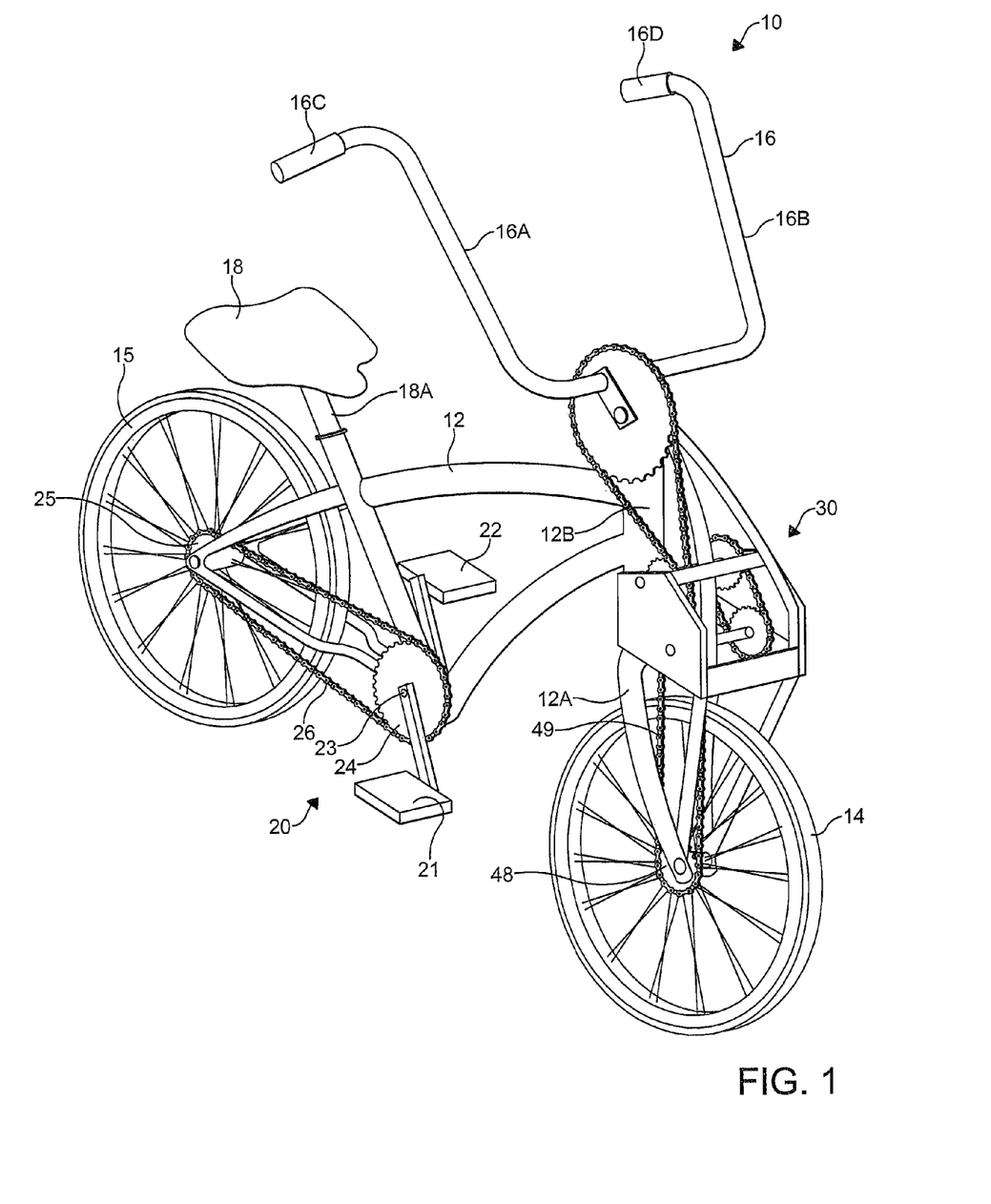
FIG. 1 is a perspective view of a bicycle having an improved arm-powered drive mechanism in accordance with this invention.

Referring now to the drawings, there is illustrated in FIG. 1 a bicycle, indicated generally at 10, having an improved arm-powered drive mechanism, indicated generally at 30, in accordance with this invention. For the sake of clarity, various directional terms (such as forward, rearward, upward, downward, left, right, and the like) will be used herein to describe the structure and operation of the bicycle 10 and the arm-powered drive mechanism 30. These directional terms are based on the frame of reference of a rider sitting on the bicycle 10 in a normal manner. However, it will be appreciated that the use of such directional terms is not intended to limit the scope of this invention in any manner.

The illustrated bicycle 10 includes a frame 12. The frame 12 may be embodied as any structure that is capable of supporting a rider (not shown) thereon. In the illustrated embodiment, for example, the frame 12 is a recumbent-style bicycle frame that supports the rider in a slightly reclined position. It should be appreciated, however, that the frame 12 may be embodied as a more traditional upright frame or any other style of frame.

The illustrated frame 12 is supported on a pair of drive members, such as a front wheel 14 and a rear wheel 15, respectively. The bicycle 10 may alternatively include any number of wheels, such as a tricycle or a quadracycle. As such, the term "bicycle" as used throughout this disclosure is not limited to a vehicle having only the two illustrated wheels 14 and 15, but may be any device that includes any number of drive members. Additionally, the bicycle 10 may be configured as a stationary exercise bike, a device for use in therapeutic treatment, or a paddle boat. Thus, it should be appreciated that this invention may be used in any desired environment and for any desired purpose.

The illustrated wheels 14 and 15 each include a hub that is rotatably supported on the frame 12. Each hub may be a multi-speed hub having a plurality of selectable gears for multiple speed capability. For example, either or both of the hubs may be a three-speed hub, which can provide gear ratios of 1:0.63, 1:0.75, and 1:1.00. Alternatively, either or both of the hubs may be an eight-speed hub, which can provide gear ratios of 1:1.00, 1:30, 1:48, 1:69, 1:92, 2:20, 2:50, and 3:25.

As shown, the rear wheel 15 is supported directly on a portion of the frame 12. The front wheel 14 is supported for rotation on a front fork 12A that, in turn, is supported on the frame 12 for pivoting movement in left and right directions relatively thereto. The front fork 12A includes a pair of generally parallel legs that extend downward from an upper stem. The upper stem is supported for rotation to a lower end of a head tube portion 12B that is provided on a forward portion of the frame 12. The front wheel 14 is supported between the downwardly-extending legs of the front fork 12A.

A handlebar 16 is supported on an upper end of the head tube portion 12B of the frame 12. The handlebar 16 is connected to the front forks 12A by a handlebar stem 12C (see FIG. 2) for movement therewith. As a result, the handlebar 16 can be used to turn the front fork 12A and the front wheel 14 relative to the frame 12, thereby allowing the rider to steer the bicycle 10 in a desired direction of movement. The illustrated handlebar 16 includes a pair of arms 16A and 16B that extend generally parallel with one another from the handlebar stem 12C, although such is not required. Handles 16C and 16D are respectively provided at distal ends of the arms 16A and 16B. It should be appreciated that the arms 16A and 16B can have any desired length or shape to provide increased torque and a longer stroke, as will be explained below. In one non-limiting example, the arms 16A and 16B can each have a length of approximately fifteen inches to eighteen inches. The structure and operation of the handlebar 16 will be described in further detail below.

A seat 18 may also be provided on the frame 12 to support a rider (not shown) on the bicycle 10. The illustrated seat 18 can be supported on a seat post 18A, which may be adjustably secured to the frame 12 if desired. It should be appreciated that the bicycle 10 may include any number or configuration of seats to support multiple riders thereon, such as a tandem bike or the like, as will be explained in further detail below.

The illustrated bicycle 10 also includes a leg-powered crank mechanism, indicated generally at 20, although such is not required. The illustrated leg-powered crank mechanism 20 includes a pair of pedals 21 and 22 that are connected by respective crank arms to a crank axle 23. The crank axle 23 is supported on the frame 12 for rotation about an axis thereof. As such, the pedals 21 and 22 can be rotated by the legs of the rider in a circular motion to effect rotation of the crank axle 23.

The leg-powered crank mechanism 20 also includes a drive sprocket 24 that is connected to the crank axle 23 for rotation with the pedals 21 and 22. As shown, a driven sprocket 25 is supported on the hub of the rear wheel 15 for rotation therewith. In the illustrated embodiment, the drive sprocket 24 and the driven sprocket 25 are generally co-planar with one another, although such is not required. A chain 26 extends around the drive sprocket 24 and the driven sprocket 25 to form a chain and sprocket-style drive system. As such, the leg-powered crank mechanism 20 is configured to transfer rotational power from the pedals 21 and 22 to the rear wheel 15 for propelling the bicycle 10 in a forward direction of travel. Alternatively, the leg-powered crank mechanism 20 can include a belt and pulley style drive system, a driveshaft, or any other desired drive system. The leg-powered crank mechanism 20 may also include a gear shifting mechanism, such as a conventional derailleur system, which provides a plurality of selectable gears for multiple speed capability.

Figure 2:
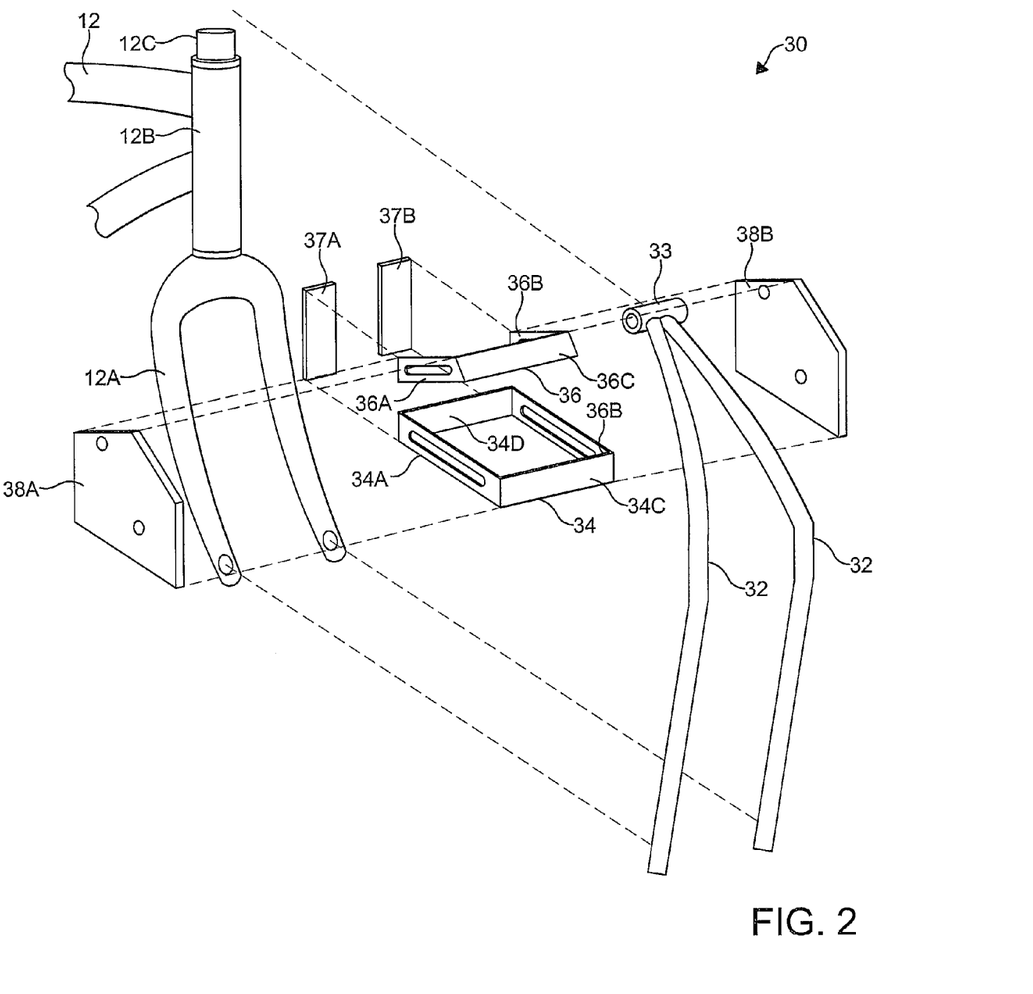
FIG. 2 is an enlarged exploded perspective view of a support frame for the arm-powered drive mechanism illustrated in FIG. 1.
Figure 3:
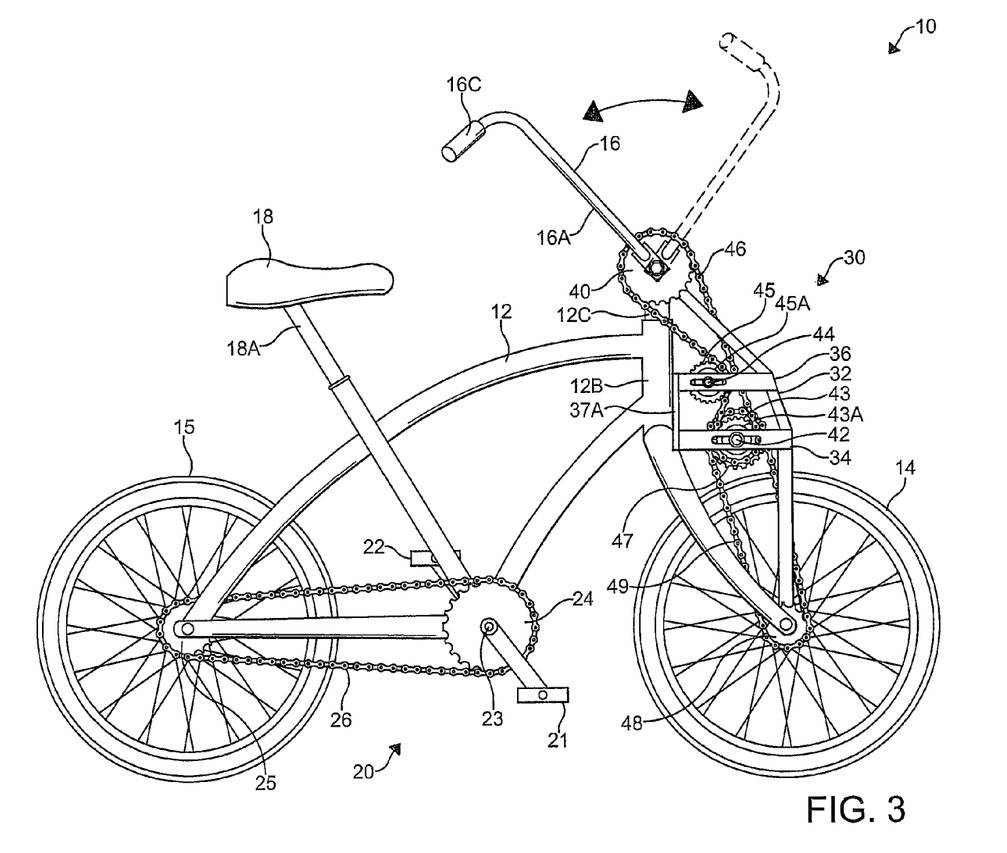
FIG. 3 is a left side elevational view of the bicycle illustrated in FIG. 1, wherein the side support braces have been removed for clarity.
Figure 4:
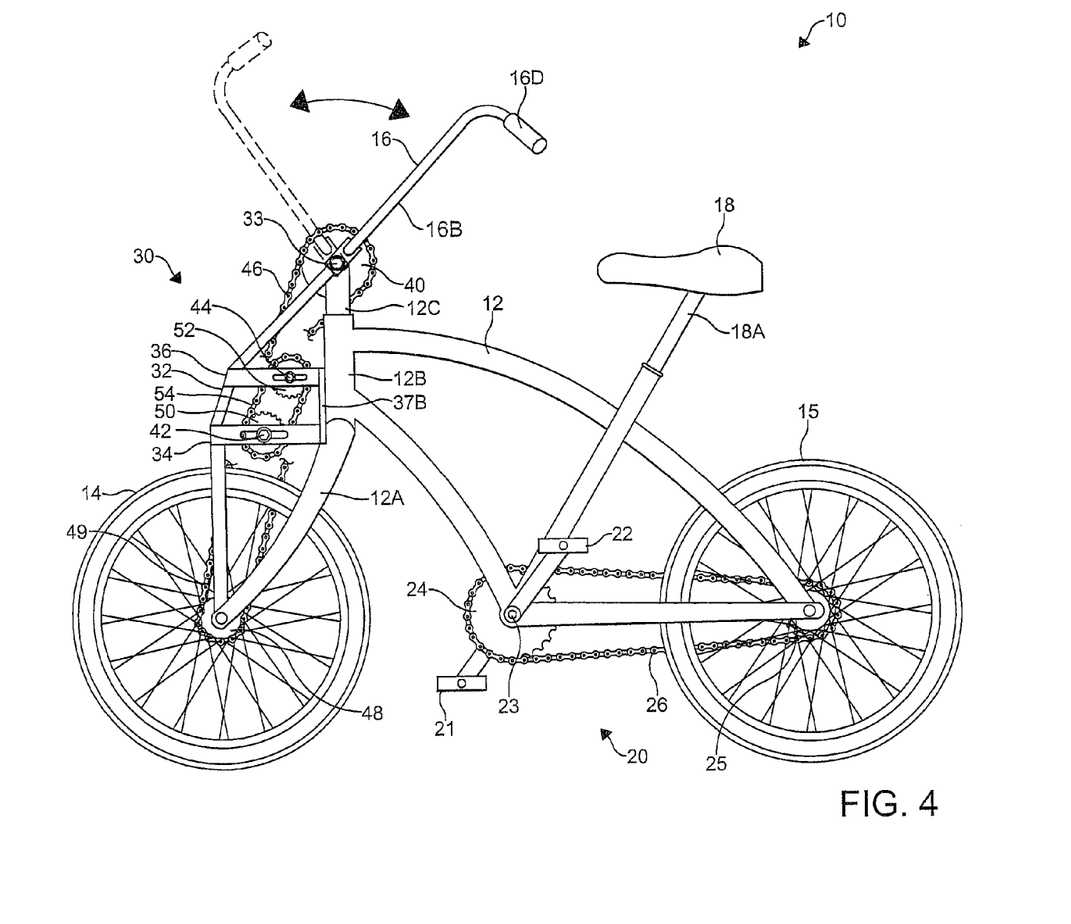
FIG. 4 is a right side elevational view of the bicycle illustrated in FIG. 1, wherein the side support braces have been removed for clarity.

The illustrated bicycle 10 also includes an arm-powered drive mechanism, indicated generally at 30, provided on a forward portion of the bicycle 10. As shown in FIG. 2, the arm-powered drive mechanism 30 includes a support frame that, in the illustrated embodiment, includes a pair of generally vertical support members 32. Upper ends of the vertical support members 32 are secured to a support sleeve 33. In turn, the support sleeve 33 is connected to the handlebar stem 12C of the head tube portion 12B. As will be explained below, the handlebar 16 is supported for pivotal movement in a forward and rearward direction by the support sleeve 33. Lower ends of the vertical support members 32 are respectively secured to distal ends of the legs on the front forks 12A. As such, the arm-powered drive mechanism 30 is fixed for pivoting movement with the front fork 12A and the handlebar stem 12C relative to the frame 12 as the bicycle 10 is steered by the rider.

A first support bracket 34 is secured to central portions of the vertical support members 32. In the illustrated embodiment, the first support bracket 34 is generally rectangular in shape and includes a pair of opposed side walls 34A and 34B that are each connected to a front wall 34C and a rear wall 34D. The front wall 34C can be secured to the vertical support members 32, and the rear wall 34D can be secured to the front forks 12A, although such is not required. Each of the opposed side walls 34A and 34B has an elongated slot formed therein, the purpose of which will be explained below. The first support bracket 34 may, however, have any alternative shape or design as desired.

The illustrated support frame further includes a second support bracket 36. The second support bracket 36 is also secured to a central portion of the vertical support members 32 and is located above the first support bracket 34. The second support bracket 36 includes a pair of opposed side walls 36A and 36B that are each connected to a front wall 36C so as to define a generally U-shaped member. As such, when the front wall 36C is secured to the vertical support members 32, the head tube portion 12B of the frame 12 extends between the opposed side walls 36A and 36B. This configuration enables the illustrated arm-powered drive mechanism 30 to achieve a compact design, although such is not required. Each of the opposite side walls 36A and 36B has an elongated slot formed therein, the purpose of which will also be explained below. The second support bracket 36 may, however, have any alternative shape or design as desired.

First and second rear support braces 37A and 37B extend vertically between the first and second support brackets 34 and 36. The illustrated rear support braces 37A and 37B are rigid plate-like members but may have any other shape or configuration. The rear support braces 37A and 37B are respectively secured to the rear wall 34D of the first support bracket 34 and to the free ends of the side walls 36A and 36B of the second support bracket 36.

The support frame also includes a pair of side support braces 38A and 38B. The illustrated side support braces 38A and 38B are also rigid plate-like members but may have any other shape or configuration. The side support braces 38A and 38B are respectively secured to the opposite side walls 34A and 34B of the first support bracket 34 and the opposite side walls 36A and 36B of the second support bracket 36. As shown, the side support braces 38A and 38B may include apertures extending therethrough, although such is not required. The rear support braces 37A and 37B and the side support braces 38A and 38B provide added support to the arm-powered drive mechanism 30. It should be appreciated, however, that the support frame of the arm-powered drive mechanism 30 is not limited to the illustrated embodiment.

Referring now to FIGS. 3 through 7, the operating components of the arm-powered drive mechanism 30 will be described. As shown therein, the arm-powered drive mechanism 30 includes a drive sprocket 40. The drive sprocket 40 is supported on an axle that is, in turn, supported for rotation within the support sleeve 33 of the support frame. The handlebar 16 is secured to the drive sprocket 40 for rotation therewith. Thus, as will be explained in detail below, pivoting movement of the handlebar 16 causes concurrent rotation of the drive sprocket 40. The handlebar 16 is preferably secured to the drive sprocket 40 at a location that is radially spaced from an axis of rotation thereof, although such is not required. This configuration creates leverage which generates torque for rotation of the drive sprocket 40 when the handlebar 16 is pivoted. The drive sprocket 40 can be a conventional tooth-style sprocket having any diameter or number of teeth. For example, the drive sprocket 40 may have forty-eight teeth.

A first driven axle 42 is rotatably supported on the first support bracket 34. For example, opposite ends of the first driven axle 42 can be adjustably secured within the slots that are formed in the opposite side walls 34A and 34B of the first support bracket 34. The first driven axle 42 can be embodied as any desired member, such as a hub that is supported for rotation on bearings. A first driven sprocket 43 is supported on the first driven axle 42 by a first free-wheel mechanism 43A. The first free-wheel mechanism 43A is conventional in the art and may include an overrunning clutch or any mechanism that is configured to lock the first driven axle 42 for rotation with the first driven sprocket 43 in a first rotational direction and to allow the first driven axle 42 to freely spin relative to the first driven sprocket 43 in a second rotational direction. In the embodiment described herein, the first free-wheel mechanism 43A is configured to lock the first driven axle 42 for rotation with the first driven sprocket 43 when the first driven sprocket 43 is rotated in the forward direction (i.e., clockwise when viewing FIG. 3). Conversely, the first free-wheel mechanism 43A is configured to allow the first driven sprocket 43 to spin freely on the first driven axle 42 when the first driven sprocket 43 is rotated in the rearward direction (i.e., counterclockwise when viewing FIG. 3). The first driven sprocket 43 can be a conventional tooth-style sprocket having any diameter or number of teeth. For example, the first driven sprocket 43 can have sixteen teeth. In the illustrated embodiment, the first driven sprocket 43 is generally co-planar with the drive sprocket 40, although such is not required.

A second driven axle 44 is rotatably supported by the second support bracket 36. For example, opposite ends of second driven axle 44 can be adjustably secured within the slots that are formed in the opposite side walls 36A and 36B of the second support bracket 36. The second driven axle 44 can also be embodied as any desired member, such as a hub that is supported for rotation on bearings. A second driven sprocket 45 is supported on the second driven axle 44 by a second free-wheel mechanism 45A. The second free-wheel mechanism 45A is also conventional in the art and may include an overrunning clutch or any mechanism that is configured to lock the second driven axle 44 for rotation with the second driven sprocket 45 when the second driven sprocket 45 is rotated in the forward direction (i.e., clockwise when viewing FIG. 3). Conversely, the second free-wheel mechanism 45A is configured to allow the second driven sprocket 45 to spin freely on the second driven axle 44 when the second driven sprocket 45 is rotated in the rearward direction (i.e., counter clockwise when viewing FIG. 3). The second driven sprocket 45 may also be a conventional tooth-style sprocket having any diameter or number of teeth. For example, the second driven sprocket 45 can have sixteen teeth. The second driven sprocket 45 is also generally co-planar with the drive sprocket 40, although again such is not required.

A first chain 46 extends around portions of the drive sprocket 40, the first drive sprocket 43, and the second driven sprocket 45. The first chain 46 can be a conventional link-style chain or any other type of linkage member that is configured to transfer power between the sprockets 40, 43, and 45. It should be appreciated, however, that the sprockets 40, 43, and 45 and the first chain 46 can alternatively be configured as a belt and pulley style drive system or any other desired drive system.

Figure 7:
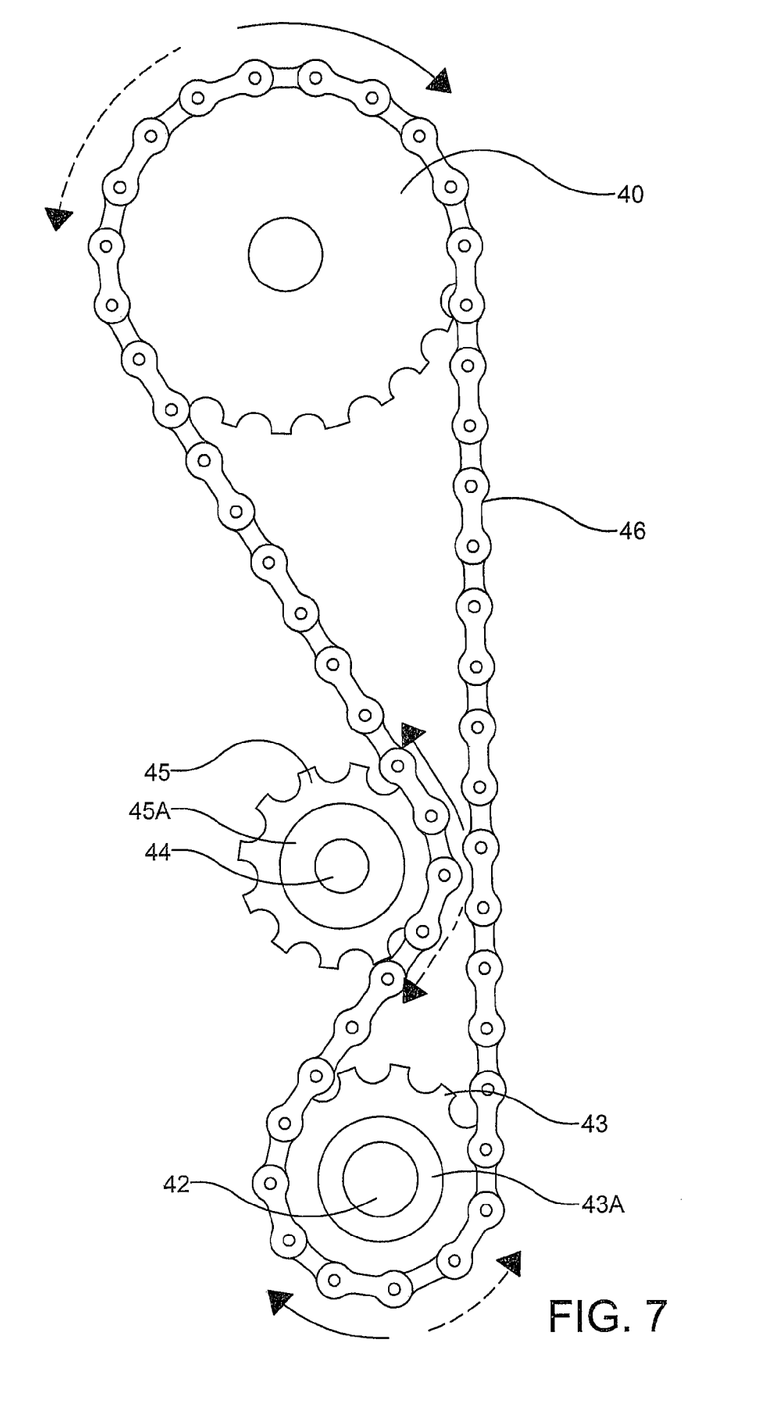
FIG. 7 is an enlarged left side elevational view of a portion of the arm-powered drive mechanism illustrated in FIGS. 1 and 3 through 6.

The manner of operation of the sprockets 40, 43, and 45 and the first chain 46 is most clearly shown in FIG. 7. When the drive sprocket 40 is rotated in a clockwise direction, the first chain 46 causes both (1) the first driven sprocket 43 to be rotated in the clockwise direction and (2) the second driven sprocket 45 to be rotated in a counterclockwise direction (as indicated by the solid direction arrows). Similarly, when the drive sprocket 40 is rotated in the counterclockwise direction, the first chain 46 causes both (1) the first driven sprocket 43 to be rotated in the counterclockwise direction and (2) the second driven sprocket 45 to be rotated in a clockwise direction (as indicated by the dashed direction arrows). Thus, it can be seen that regardless of the direction of rotation of the drive sprocket 40, the first driven sprocket 43 and the second driven sprocket 45 are simultaneously rotated in opposite directions relative to one another. The purpose for this configuration will be explained below.

A final drive sprocket 47 is also supported on the first drive axle 42 for rotation therewith. The illustrated final drive sprocket 47 is located adjacent the first driven sprocket 43, although such is not required. The final drive sprocket 47 can be a conventional tooth-style sprocket having any diameter and number of teeth. For example, the final drive sprocket 47 can have twenty-six teeth.

A front hub sprocket 48 is also supported on the hub of the front wheel 14 for rotation therewith. The front hub sprocket 48 can be a conventional tooth-style sprocket having any diameter and number of teeth. For example, the front hub sprocket 48 can have thirteen teeth. The front hub sprocket 48 is generally co-planar with the final drive sprocket 47, although such is not required.

A second chain 49 extends around portions of the final drive sprocket 47 and the front hub sprocket 48. The second chain 49 can be a conventional link-style chain or any other linkage member that is configured to transfer rotational power between the respective sprockets 47 and 48. It should be appreciated, however, that the final drive sprocket 47 and the front hub sprocket 48 and the second chain 49 can alternatively be configured as a belt and pulley style drive system or any other desired drive system. A gear shifting mechanism, such as a conventional derailleur system, may also be provided on the final drive sprocket 47 and the front hub sprocket 48 for providing a plurality of selectable gears for multiple speed capability.

A first intermediate sprocket 50 is also supported on the first driven axle 42 for rotation therewith. The illustrated first intermediate sprocket 50 is located at an end of the first driven axle 42 that is opposite the first driven sprocket 43, although such is not required. The first intermediate sprocket 50 can be a conventional tooth-style sprocket having any diameter and number of teeth. For example, the first intermediate sprocket 50 can have sixteen teeth.

A second intermediate sprocket 52 is supported on the second driven axle 44 for rotation therewith. The illustrated second intermediate sprocket 52 is located at an end of the second driven axle 44 that is opposite the second driven sprocket 45, although such is not required. The second intermediate sprocket 52 may also be a conventional tooth-style sprocket having any diameter and number of teeth. For example, the second intermediate sprocket 52 can have sixteen teeth. The illustrated first and second intermediate sprockets 50 and 52 are generally co-planar with one another, although such is not required.

A third chain 54 extends around portions of the first intermediate sprocket 50 and the second intermediate sprocket 52. For example, the third chain 54 can be a conventional link-style chain or any other linkage member that is configured to transfer power between the first intermediate sprocket 50 and the second intermediate sprocket 52. It should be appreciated, however, that the first intermediate sprocket 50 and the second intermediate sprocket 52 and the third chain 54 can alternatively be configured as a belt and pulley style drive system or any other desired drive system. The purpose of the first intermediate sprocket 50 and the second intermediate sprocket 52 will be explained below.

Figure 5:
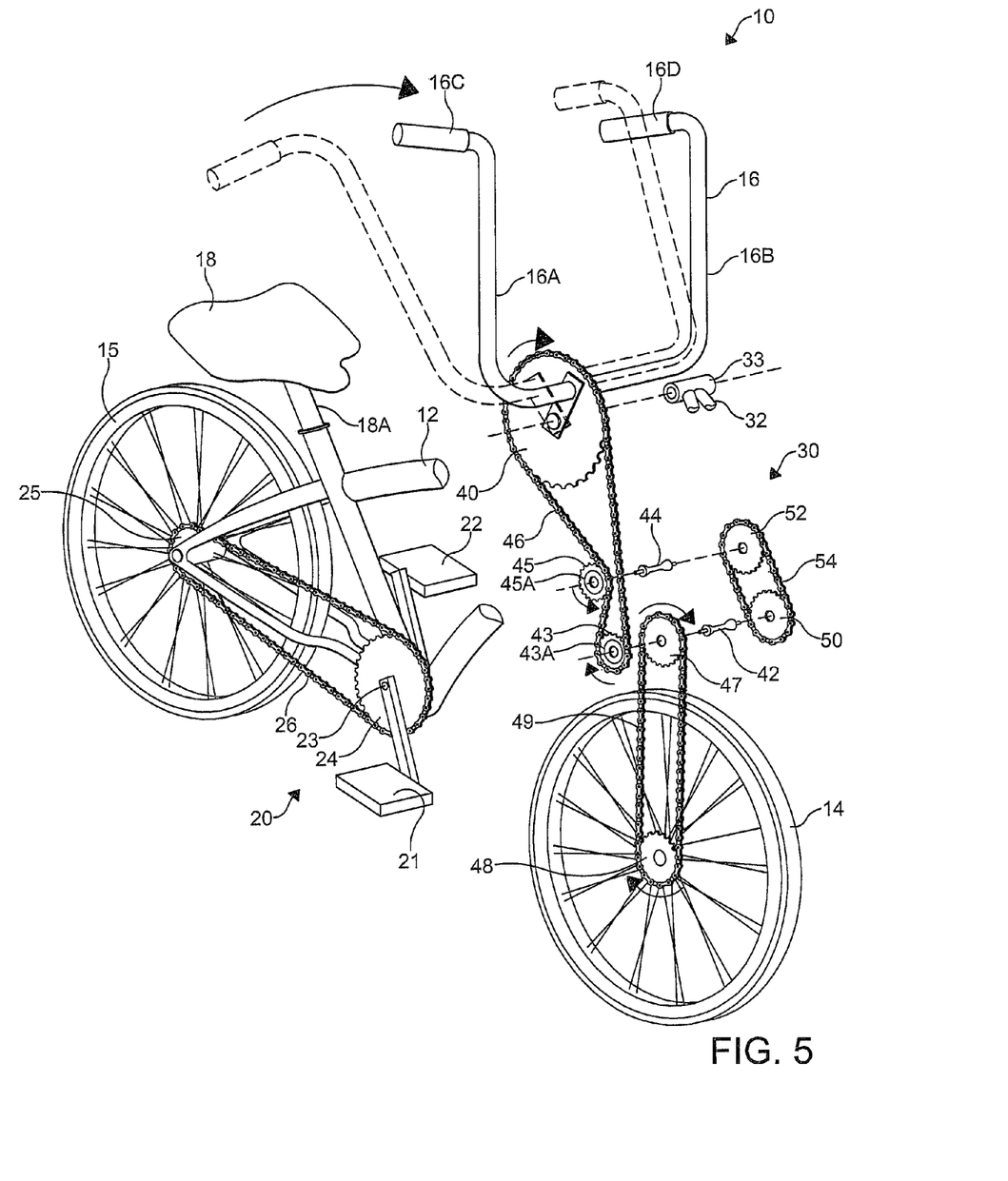
FIG. 5 is an exploded perspective view of the arm-powered drive mechanism illustrated in FIG. 1 shown in a first operating position.
Figure 6:
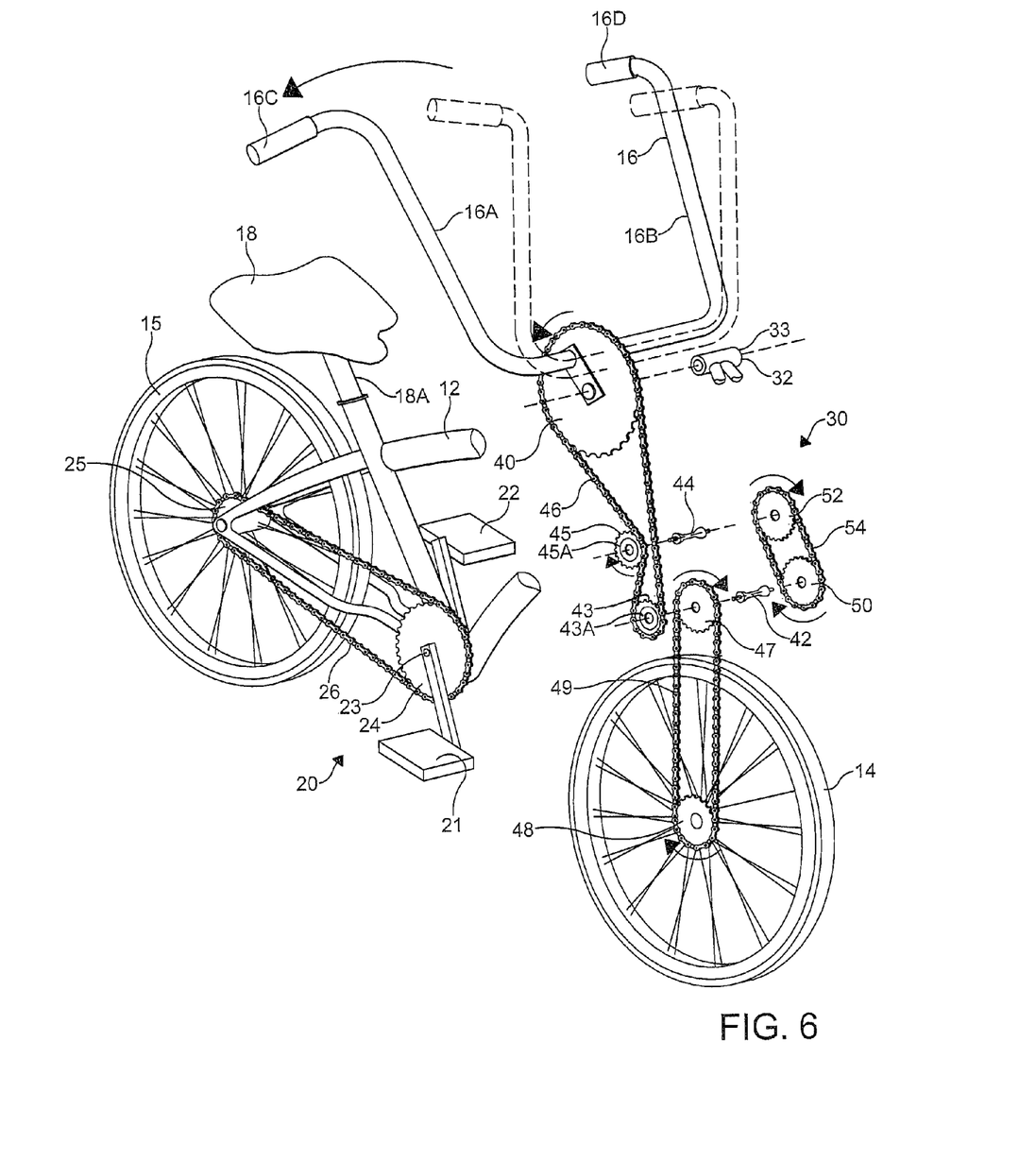
FIG. 6 is an exploded perspective view of the arm-powered drive mechanism illustrated in FIG. 1 shown in a second operating position.

Referring now to FIGS. 5 and 6, the operation of the arm-powered drive mechanism 30 will be explained. As shown in FIG. 5, the handlebar 16 can be pivoted from a rearward position (illustrated by the broken lines) to a forward position using a push-stroke, as indicated by the arrow. Such pivoting movement of the handlebar 16 causes the drive sprocket 40 to be rotated in the forward direction (clockwise when viewing FIG. 7). As a result, the first driven sprocket 43 is also rotated in the forward direction (clockwise when viewing FIG. 7) by the first chain 46. The first free-wheel mechanism 43A of the first driven sprocket 43 becomes engaged, thereby also rotating the first driven shaft 42 in the forward direction. Rotation of the first driven shaft 42 in the forward direction also rotates the final drive sprocket 47 in the forward direction. In turn, the front hub sprocket 48 is rotated in the forward direction. As a result, the front wheel 14 is rotated in the forward direction, thereby propelling the bicycle 10 in a forward direction of travel.

At the same time, however, the pivoting of the handlebar 16 from the rearward position to the forward position causes the second driven sprocket 45 to be rotated in the rearward direction (counterclockwise when viewing FIG. 7) by the first chain 46. The second free-wheel mechanism 45A of the second driven sprocket 45 becomes disengaged, thereby freely spinning in the rearward direction on the second driven shaft 44.

As shown in FIG. 6, the handlebar 16 can also be pivoted from the forward position (illustrated by the broken lines) to the rearward position using a pull-stroke. In doing so, the drive sprocket 40 is rotated in the rearward direction (counterclockwise when viewing FIG. 7), and the second driven sprocket 45 is rotated in the forward direction (clockwise when viewing FIG. 7) by the first chain 46. The second free-wheel mechanism 45A of the second driven sprocket 45 becomes engaged, thereby rotating the second driven shaft 44 in the forward direction. During the pull-stroke, however, the first driven sprocket 43 freely spins in the rearward direction on the first driven shaft 42.

Rotation of the second driven shaft 44 in the forward direction also rotates the second intermediate driven sprocket 52 in the forward direction. The first intermediate driven sprocket 50 is also rotated in the forward direction by the third chain 54. In turn, the first intermediate driven sprocket 50 rotates the first driven shaft 42. As a result, the final driven sprocket 47 is also rotated in the forward direction. The front hub sprocket 48 is simultaneously rotated in the forward direction by the second chain 49. As a result, the front wheel 14 is rotated in the forward direction, thereby propelling the bicycle 10 in the forward direction of travel.

Thus, it will be appreciated that the illustrated bicycle 10 can be propelled in the forward direction of travel when the handlebar 16 is pivoted in either the forward direction using a push-stroke or a rearward direction using a pull-stroke. As such, the arm-powered drive mechanism 30 is configured to harness the rider's energy during both the push-stroke and the pull-stroke, which use the muscles of the arms, the shoulders, the back, and the chest.

The mechanical advantage provided by the illustrated arm-powered drive mechanism 30 will now be explained. Typically, the gear ratio of the leg-powered crank mechanism 20 on a single speed bicycle is approximately 2.5:1. For example, the drive sprocket 24 of the leg-powered crank mechanism 20 can have forty teeth and the driven sprocket 25 of the rear wheel 15 can have sixteen teeth. As a result, when the drive sprocket 24 is rotated one revolution, the rear wheel 15 rotates two and a half revolutions.

In the embodiment described herein, however, the drive sprocket 40 of the arm-powered drive mechanism 30 has forty-eight teeth. The first driven sprocket 43 and the second driven sprocket 45 each have sixteen teeth. Thus, a gear ratio gain of approximately 3:1 is respectively obtained between the drive sprocket 40 and each of the first driven sprocket 43 and the second driven sprocket 45.

Additional mechanical advantage may be provided between the final drive sprocket 47 and the front hub sprocket 49. For example, in the illustrated embodiment the final drive sprocket 47 has twenty-six teeth and the front hub sprocket 49 has thirteen teeth, which yields an additional gear ratio gain of approximately 2:1. Thus, a total gear ratio gain of approximately 6:1 can be achieved by the arm-powered drive mechanism 30 described herein.

The mechanical advantage provided by the push-stroke may also be different than the mechanical advantage provided by the pull-stroke. For example, the push-stroke can be configured to have a total gear ratio gain of approximately 6:1, as described above, while the pull-stroke can have a total gear ratio gain of approximately 9:1. This can be accomplished by providing the first intermediate sprocket 52 with twenty-four teeth and the first intermediate sprocket 50 with sixteen teeth, which provides an additional gear ratio gain of 1.5:1 to achieve a total gear ration gain of approximately 9:1. It should be appreciated that the pull-stroke can have any desired gear ratio gain and the pull-stroke can have the same or any other desired gear ratio gain.

Further, as briefly described above, the hub of the front wheel 14 may have multiple gears, which can provide additional mechanical advantage. In a non-limiting example, the hub of the front wheel 14 can be a three-speed hub with a high speed gear ratio of 1.5:1, which would yield a total ratio gain of 9:1 in high gear. In another example, the hub of the front wheel 14 can be an eight-speed hub with a high gear ratio of 3:1, which would yield a total ratio gain of 18:1 in high gear.

The mechanical advantage in the arm-powered drive mechanism 30 can be altered by varying the gear ratios between any of the respective sprockets. Therefore, a desired gear ratio may be provided to achieve a desired amount of pivotal resistance in the handlebar 16 versus the amount of power that is delivered to the front wheel 14. Although the maximum speed of the bicycle 10 is relative to the specific rider, the gear ratio gain of the arm-powered drive mechanism 30 is constant in comparison to the leg-powered crank mechanism 20 regardless of the rider's physical abilities.

Another advantage of the illustrated arm-powered drive mechanism 30 is provided by the counter rotating free-wheel mechanisms 43A and 45A of the first and second driven sprockets 43 and 45. The counter rotating free-wheel mechanisms 43A and 45A enable the rider to selectively vary the length of the stroke of the handlebar 16 at any time. In other words, the stroke of the handlebar 16 can be reversed in the opposite direction at any time during the respective stroke, and the counter rotating free-wheel mechanisms 43A and 45A immediately harnesses energy in the reverse direction. For example, a longer stroke increases the rotation of the drive sprocket 40 and generates more rotations of the first and second driven sprockets 43 and 45, which may be desirable for high speeds. A shorter stroke can be used when starting from a stop position or when ascending a hill. Further, the counter rotating free-wheel mechanisms 43A and 45A enables the pivotal movement of the handlebar 16 to be stopped at anytime during a stroke without impeding the forward movement of the bicycle 10 (i.e., the respective shafts 42 and 44 are freely spinning relative to the free-wheel mechanisms 43A and 45A). The ability of the rider to control the stroke of the handlebar 16 also allows for easy steering at all times, even during a stroke.

Another advantage of the illustrated bicycle 10 is the increased length of the arms 16A and 16B of the handlebar 16 when compared to the length of the crank arms in the leg-powered crank mechanism 20. For example, the arms 16A and 16B of the handlebar 16 can have a length of approximately fifteen inches, which provides an overall length of approximately eighteen inches from the axis of rotation of the drive sprocket 40 to the handles 16C and 16D. In comparison, the length of the crank arms in the leg-powered crank mechanism 20 can be approximately six inches to about eight inches. This increased length can generate increased leverage, which results in increased torque, and can provide for a longer stroke of the handlebar 16.

A longer stroke allows for a greater number of revolutions of the front wheel 14 through just one stroke of the handlebar 16. For example, a crank arm having a length of approximately six inches generates power over a twelve inch distance when rotated in a circular motion (i.e., the distance from a top of the motion to a bottom of the motion). Thus, one leg is pushing down to generate power over a twelve inch stroke while the other leg is being lifted by the alternate crank arm. However, the illustrated arm-powered drive mechanism 30 allows both arms to generate power over a much longer stroke of approximately eighteen inches. It has been found, for example, that a single push-stroke or pull-stroke can propel the bicycle 10 a distance of travel that is equal to two complete revolutions of the leg-powered crank mechanism 20. A longer stroke also uses different muscles group, as explained above, to generate energy. This enables the bicycle 10 to achieve higher speeds and may also help to reduce muscle fatigue.

It should also be appreciated that the illustrated bicycle 10 can be propelled by the leg-powered crank mechanism 20 alone, the arm-powered drive mechanism 30 alone, or both the leg-powered crank mechanism 20 and the arm-powered drive mechanism 30 in combination. As such, if the muscles that are being used for the arm-powered drive mechanism 30 become fatigued or are otherwise engaged in steering through a tight turn or on rough terrain, then the leg-powered crank mechanism 20 can be used independently. If, however, higher speeds or more power is desired, then the arm-powered drive mechanism 30 can be used independently, or the leg-powered crank mechanism 20 and the arm-powered drive mechanism 30 can be used in combination.

In one example, a rider on a conventional leg-powered bicycle typically needs to downshift to a lower gear when encountering an incline such as a hill, which slows the speed of the bicycle. The illustrated bicycle 10, however, allows the rider to utilize both the leg-powered crank mechanism 20 and the arm-powered drive mechanism 30 in combination to achieve increased speeds when ascending a hill. In addition, the bicycle 10 can provide a full cardiovascular system workout by exercising the muscles of the arms, the shoulders, the chest, the back, and the legs at the same time.

It should also be appreciated that a plurality of arm-powered drive mechanisms 30 can be provided on a tandem bicycle. One advantage is that the arm-powered drive mechanism 30 would not require the riders to pump in synchronicity. Because the riders sit behind each other on a tandem bicycle, wind drag is not appreciably increased as the number of riders is increased. Thus, a tandem bicycle using a plurality of arm-powered drive mechanisms 30 makes is possible to achieve even higher speeds with multiple riders applying energy using their arms and leg. These and other advantages can be provided by the arm-powered drive mechanism 30 illustrated herein.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle comprising:
   a frame including a drive member supported thereon for rotation;
   a handlebar supported for pivotal movement relative to the frame; and
   a drive mechanism provided on the frame that is configured to rotate the drive member in a first rotational direction when the handlebar is pivoted in either a first direction using a push-stroke or a second direction using a pull-stroke, the drive mechanism including:
   a first driven axle having a first driven sprocket supported thereon;
   a second driven axle having a second driven sprocket supported thereon; and
   a chain that extends around portions of the drive sprocket, the first driven sprocket, and the second driven sprocket.

2. The vehicle defined in claim 1 wherein the drive member is a first wheel supported for rotation on the frame, and wherein the drive mechanism is configured to rotate the first wheel.

3. The vehicle defined in claim 2 further including a second wheel supported on the frame for rotation, and a wherein crank-style drive mechanism is provided on the frame to rotate the second wheel independently of the first wheel.

4. The vehicle defined in claim 2 wherein the first wheel is supported between a pair of forks that, in turn, is supported for rotation on the frame, and wherein the drive mechanism is supported on the pair of forks for rotation therewith relative to the frame.

5. The vehicle defined in claim 1 wherein the drive mechanism includes a rotatable drive sprocket, and wherein the handlebar is connected to the drive sprocket for rotation therewith.

6. The vehicle defined in claim 1 wherein a final drive sprocket is supported on the first driven axle for rotation therewith, and wherein a hub sprocket is supported on a hub of the drive member for rotation therewith.

7. The vehicle defined in claim 6 wherein a second chain extends around portions of the final drive sprocket and the hub sprocket on the drive member.

8. The vehicle defined in claim 6 wherein the final drive sprocket and the hub sprocket on the drive member are configured to provide a ratio gain.

9. The vehicle defined in claim 6 wherein the hub of the drive member is a multi-speed hub.

10. The vehicle defined in claim 1 wherein the first driven sprocket is supported on the first driven axle by a first free-wheel mechanism, and wherein the second driven sprocket is supported on the second driven axle by a second free-wheel mechanism.

11. The vehicle defined in claim 10 wherein the first free-wheel mechanism is configured to rotate the first driven axle in the first rotational direction when the handlebar is pivoted in the first direction, and wherein the second free-wheel mechanism is configured to rotate the second driven axle in the first rotational direction when the handlebar is pivoted in the second direction.

12. The vehicle defined in claim 11 wherein a first intermediate sprocket is supported on the first driven axle for rotation therewith, and wherein a second intermediate sprocket is supported on the second driven axle for rotation therewith.

13. The vehicle defined in claim 12 wherein a third chain extends around portions of the first and second intermediate sprockets.

14. The vehicle defined in claim 12 wherein the first and second intermediate sprockets are configured to provide a ratio gain.

15. The vehicle defined in claim 1 wherein the drive sprocket and the first and second driven sprockets are configured to provide a ratio gain.

16. A vehicle comprising:
a frame including a first wheel supported between a pair of forks that, in turn, is supported for rotation within a head tube of the frame and a second wheel supported for rotation on the frame;
a handlebar supported for pivotal movement within a support sleeve that, in turn, is connected to the pair of forks for rotation within the head tube;
an arm-powered drive mechanism provided on the frame, wherein the arm-powered drive mechanism is configured to rotate the first wheel in a first rotational direction when the handlebar is pivoted within the support sleeve in either a first direction using a push-stroke or a second direction using a pull-stroke; and
a leg-powered crank mechanism provided on the frame, wherein the leg-powered crank mechanism is configured to rotate the second wheel in the first rotational direction independent of the first wheel, wherein the arm-powered drive mechanism includes a drive sprocket supported for rotation with the handlebar, a first driven sprocket supported on a first driven axle and a second driven sprocket supported on a second driven axle, and a chain that extends around the drive sprocket, around the first driven sprocket in a first rotational direction, and around the second driven sprocket in a second rotational direction.

17. The vehicle defined in claim 16 wherein the first driven sprocket is supported on the first driven axle by a first free-wheel mechanism that is configured to rotate the first driven axle in the first rotational direction when the handlebar is pivoted in the first direction, and the second driven sprocket is supported on the second driven axle by a second free-wheel mechanism that is configured to rotate the second driven axle in the first rotational direction when the handlebar is pivoted in the second direction.

18. A drive mechanism for a vehicle including a frame and a wheel that is supported for rotation relative to the frame, the drive mechanism comprising:
a handlebar that is adapted to be supported relative to a frame of a vehicle for movement in first and second directions;
a drive sprocket that is connected to rotate in first and second rotational directions when the handlebar is moved in the first and second directions, respectively;
a first driven axle having a first driven sprocket supported thereon for rotation therewith;
a second driven axle having a second driven sprocket supported thereon for rotation therewith; and
a chain that extends around portions of the drive sprocket, the first driven sprocket, and the second driven sprocket;
wherein one of the first and second driven axles is adapted to rotatably drive a wheel of the vehicle.

* * * * *